Patented Jan. 8, 1935

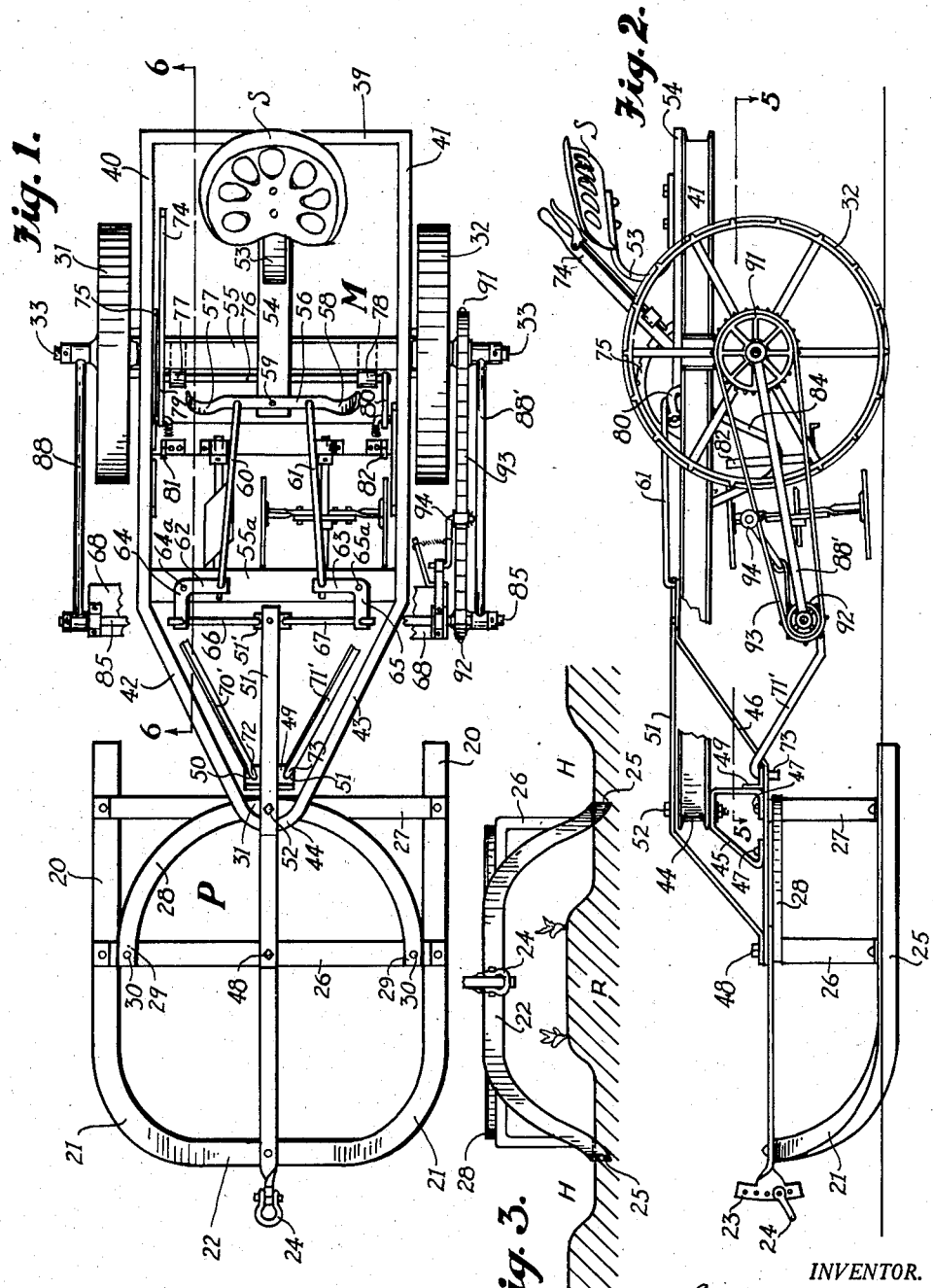

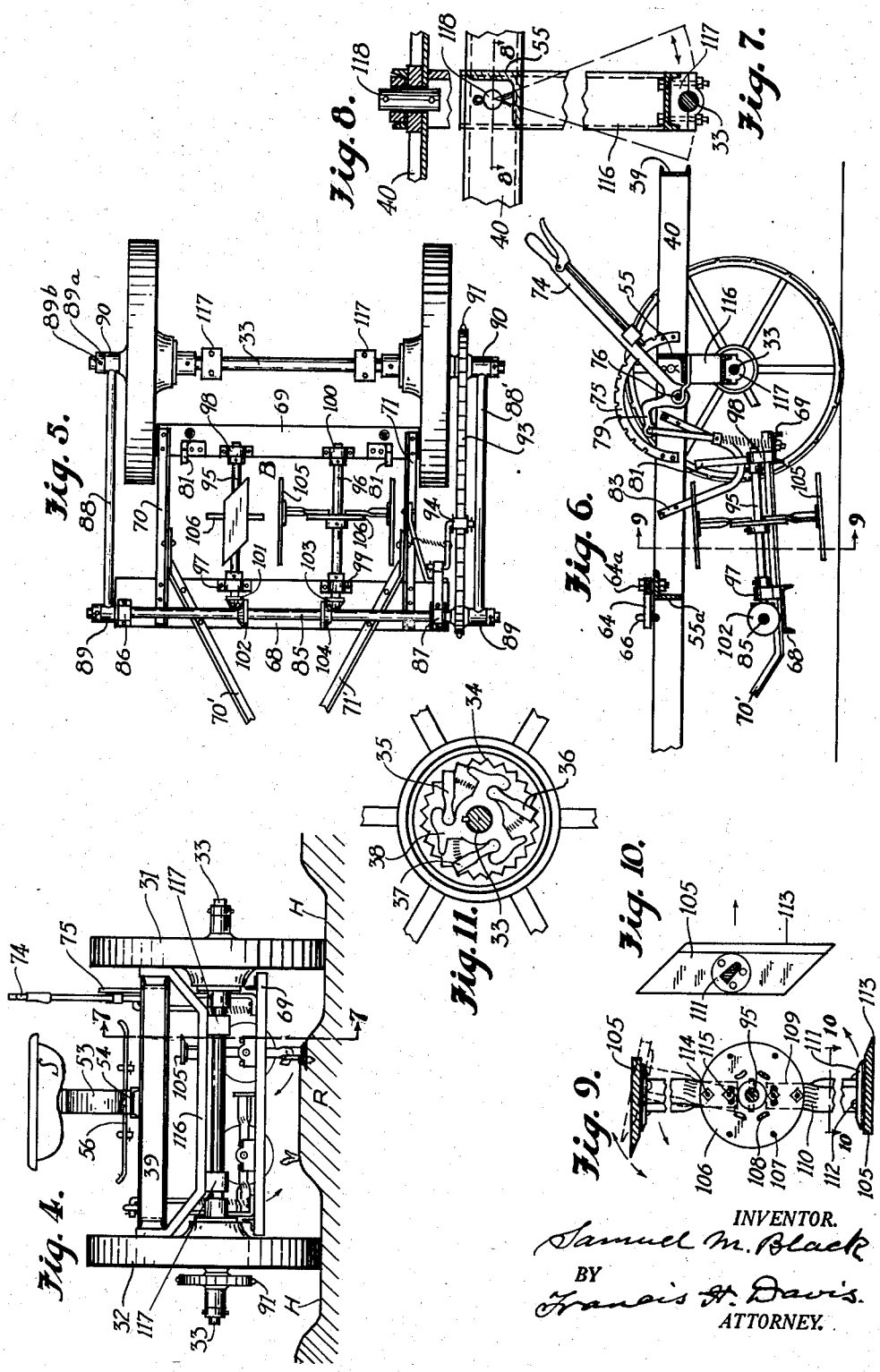
Jan. 8, 1935.  S. M. BLACK  1,986,996
PLANT THINNING APPARATUS
Filed July 31, 1933   2 Sheets-Sheet 2

1,986,996

UNITED STATES PATENT OFFICE 1,986,996

PLANT THINNING APPARATUS

Samuel M. Black, Salinas, Calif., assignor of one-half to Joseph S. Bordges, Salinas, Calif.

Application July 31, 1933, Serial No. 683,027

4 Claims. (Cl. 97—15)

This invention relates to agricultural machinery and particularly to an improved implement for thinning out, weeding and cultivating overstocked rows of plants.

In such places as California where large acreages of lettuce, beets and the like are raised, the modern practice is to plant the seed in double rows about a foot apart on long raised mounds or beds. The hollows between the beds are suitably spaced apart for the wheels of tractors and agricultural implements to travel in; they also serve for irrigational purposes, therefore it is desirable to keep them open and unobstructed.

Hitherto, when the young plants are a few inches high the customary practice has been to thin them out with a hand hoe, a costly, laborious and inefficient process. In this act the laborer faces the individual row of plants to be thinned and chops out the surplus plants by hoeing them down into the hollow, soil and all. The removal of the soil in this manner cuts gaps in the bed allowing the sun to scorch and wither the remaining plants to the impairment of the crop. The displaced soil also tends to obstruct the hollows.

A further object is to arrange the two sets of cutting blades so that they will cut upwardly, inwardly, alternately and intermittently into the respective twin rows of plants in any given bed. By this means the plants remaining after the thinning is effected are left in staggered relationship to each other, thereby providing more growing room, more sunshine, and a more equable share of irrigation water than would be the case if the plants grew transversely opposite each other.

Further objects are to provide means to operate the cutting blades; means to adjust the blades at different cutting angles; means to depress and elevate the cutting mechanism; means permitting compensative displacement of the drive-axle during such elevation or depression of the cutting blades. Further objects and advantages will here-inafter appear and will be particularly set forth in the claims and illustrated in the accompanying drawings, attached hereto and made part hereof, in which:—

Figure 1 is a top plan view of an implement disclosing an embodiment of my invention.

Figure 2 is a side elevational view of Figure 1.

Figure 3 is a front elevational view of the pilot element.

Figure 4 is a rear elevational view with parts removed for clarity.

Figure 5 is a partial top plan view taken approximately on the line 5—5 of Figure 2.

Figure 6 is a partial sectional view taken about on the line 6—6 of Figure 1.

Figure 7 is an enlarged detail elevational sectional view of the compensating member taken on the line 7—7 of Figure 4.

Figure 8 is a section taken on the line 8—8 of Figure 7.

Figure 9 is an enlarged detail of the cutting-blade assembly, taken on the line 9—9 of Figure 6.

Figure 10 is a bottom plan view of a cutting-blade taken on a line as 10—10 of Figure 9.

Figure 11 shows a detail of the ratchet elements in the ground-engaging drive wheels.

Similar reference indicia refer to similar parts throughout the several views.

In carrying out my invention I provide the combination implement comprising a pilot element P and the machine element M. The pilot may be referred to as a novel form of sled, having the runners 20—20 adapted to track in the hollows H—H.

The front ends 21 and 21 of said runners curve upwardly, forwardly and inwardly to form the bridge 22 provided with the draw member 23 and the shackle 24 for attachment to a tractive agent. The runners are preferably steel angles arranged so that the webs 25—25 grip the ground to stabilize the element against lateral displacement.

The members 26 and 27 are inverted U-shaped ties supporting the arcuate track 28 and also serving as spacers for the runners 20 and 20.

The ends 29—29 of the track 28 are carried by the support 26 and may be attached thereto by bolts as 30 or by autogenous welding, the crown 31 of said track being similarly attached to the member 27.

The machine element M is supported at the rear by the ground-engaging wheels 31 and 32 which support the axle 33. As will be noted by Figure 11 said wheels are of the conventional ratchet type used in agricultural machines such as mowers. By reference to said figure it will be noted that counter clockwise movement of the ratchet element 34 engages the related ratchet notches against the pallets of the respective pawls 35, 36 and 37 thus imparting counter clockwise movement to the member 38 which transmits similar movement to the axle 33 keyed thereto. Arranged as above described both wheels tend to drive said axle when the machine is traveling forward in a straight line, and ability to turn in either direction is provided. Further explanation on this subject is unnecessary as it forms no part of the present invention.

A structural frame is provided within the space between the wheels 31 and 32. Said frame comprises the end member 39, the respective side members 40 and 41, and the inwardly-deflecting members 42 and 43 joined together at 44 which constitutes the front end of the machine.

Reference being had to Figure 2, it will be noted that the frame part 44 rests upon the spacing bracket 45 which is secured to the lower tiller-bar 46 by rivets as 47—47 or by welding. Said bar is medially and pivotally secured to the upper side of the member 26 by the king-bolt 48. The angle bracket 49 is suitably attached in the corner formed by the adjacent portion of the bracket 45 and the bar 46. The horizontal limb of said angle bracket is apertured at 50 and 50 for a purpose that will later appear.

From a point immediately behind said angle the bar 46 slopes backwardly and upwardly preferably to a plane above the side members 42 and 43, the rear end being flattened to the plane of the rear end of the upper tiller-bar 51. The bar 51 extends in a plane vertically above the bar 46, breaks downwardly over the part 44 at a suitable angle to connect with said king-bolt, the end of the bar 51 being apertured to receive said bolt. The bolt 52 pivotally secures the forward end 44 of the machine M to the spacing bracket 45. The tiller-bar 46 is adapted to slide radially on the arcuate track 28 being pivoted by the king-bolt 48.

The seat S is supported by the spring 53 attached to the member 54 adjacent the rear end thereof. Said member is supported by and secured to the end frame member 39 and to the cross member 55. Suitably spaced forwardly of the seat, the steering bar 56 is pivotally attached above the frame member 54. Said bar is adapted to be actuated by the feet of an operator. The respective ends 57 and 58 of said bar are curved backwardly to retain the feet securely in place when rocking the bar forward by either foot from the pivot 59. The links 60 and 61 make pivotal connection between said bar and the respective transverse limbs 62 and 63 of the respective bell-cranks 64 and 65. The link rods 66 and 67 pivotally connect the respective forwardly-directed limbs of said cranks with said rear ends of the respective tiller-bars 46 and 51 by hooked engagement with the plate 51 which is pivoted to the ends of said tiller-bars. The bell cranks 64 and 65 respectively, are pivotally connected to the cross member 55a at points 44a and 65a.

From the foregoing it will be apparent that the hind end of the machine M is supported by the wheels 31 and 32; that the front end is supported on the arcuate track 28; that a tiller radially-displaceable in a horizontal plane is pivotally connected with the front of said machine, and that foot-controlled means is provided to actuate said tiller from side to side, thereby steering the front of the machine to follow any deviation from a straight line of the plant rows to be thinned.

The thinning apparatus per se.

This novel element of my invention comprises the rectangular structural frame B which is disposed well within the span, and below the level of the respective side frame members 40 and 41. Reference being had to Figures 1, 2, and 5 it will be noted that B includes the respective transverse members 68 and 69 and the respective side frame members 70 and 71, all of which are suitably secured together. The members 70' and 71' are rigidly secured to said side members and also to the transverse member 68, from whence they extend forwardly, inwardly and upwardly in equal lengths, their ends terminating in the downwardly and slightly backwardly-directed respective hooks 72 and 73, which engage the apertures 50 and 50 of the bracket 49, as is well shown in Figures 1 and 2. When so engaged the bracket 49, supported by the pilot P, coacts with said hooks to suspend the forward end of the frame B and, furthermore, provides means whereby the axis of the frame B is maintained at all times in a vertical plane directly beneath the axis of the machine M.

It being necessary to adjust the frame B at different levels with respect to said beds I do so by forward or backward actuation of the latch-lever 74 engaging the notched segment 75 attached to the side frame member 40. Said lever is fast to the rock-shaft 76 that is mounted in the bearing 77 and 78 and provided with the respective cranks 79 and 80 which are respectively linked to the transverse member 69 adjacent the ends of said member. In order to secure true up and down movement of the rear end of B uprights as 81 and 82 are carried by the extreme ends of the member 69, said uprights being adapted for slidable contact with the adjacent surfaces of the respective U-shaped guides 83 and 84 which are rigidly secured to the inner sides of the members 40 and 41.

The axle 33 extends outwardly considerably beyond the hubs of the respective wheels 31 and 32, for a purpose later appearing. The revoluble shaft 85 is journaled in the bearings 86 and 87 mounted on the member 68. Said shaft is parallel to and coextensive in length with the axle 33.

The respective spacers 88—88' connect the shaft 85 with the axle 33, they are of equal length and preferably formed of pipe provided at the forward ends with the cross heads 89—89 bored to fit the shaft 85, and provided at the rear ends with the cross heads 90—90 bored to fit the axle 33, said cross heads being held in place by collars as 89a retained by pins as 89b.

The drive sprocket 91 is fast to the axle 33 between the wheel 32 and the spacer 88'; the driven sprocket 92, acted on by the chain 93, is fast to the shaft 85 in alinement with the sprocket 92. The belt-tightener 94, attached to the member 87, acts on the chain belt 93.

The axle 95 has the bevel pinion 101 fast to its forward end. The bevel gear 102 fast to the shaft 85 intermeshes with the pinion 101 on the side nearest the axis of the machine.

The axle 96 has the bevel pinion 103 fast to its forward end. The bevel gear 104 fast to the shaft 85 intermeshes with the pinion 103 also on the side nearest the axis of the machine. By this arrangement forward travel of the implement, as viewed in Figure 1, rotates the shaft 85 counter-clockwise, which in turn, owing to the arrangement of said respective pinions and bevel gears, revolves the cutting blades 105 carried by the respective axles 95 and 96 in opposite directions, as shown by the indicating arrows in Figure 4, wherein the set of blades carried by the axle 95, and the set of blades carried by the axle 96 all cut upwardly from the hollows H into the bed R.

The cutter blade assemblies on the respective axles 95 and 96 are identically alike, except that they are rights and lefts.

Said assembly on the axle 95 comprises the member 106 centrally and transversely bored to fit said axle and fixedly secured thereto by any appropriate means that will secure it non-revolubly in relation to the axle, preferably at a point substantially midlength of said axle. Said member is provided with a series of bolt holes 107 drilled on a concentric circle reasonably close to its periphery and 60 degrees apart, in other words, on the radii of a hexagonal polygon.

Now, on a suitably smaller concentric circle, with radius extending from the outer to the inner circle, an arc is described cutting each said radius, then with the respective arcs as a center the arcuate slots 108 are formed perforating said member transversely, extending to right and left of each said radius suitably to effect a purpose to be described. The width of said slots is about equal to the diameter of the holes 107, the details of which are well shown in Figure 9. The shank 109, at suitable distances of its length, is provided with a bolt hole adapted to register with a slot 108, and with another bolt hole adapted to register with a hole 107.

The contacting surfaces of said member and shank fit flat together. The portion 110 of said shank which projects beyond the member is twisted to an angle of about 45 degrees so that the edge of said shank will be directed inwardly of the bed R when the implement is traveling forward, thereby presenting less resistance to and causing less displacement of the soil than would be the case if said shank attacked the bed broadside. The outer end of said shank terminates in the head 111 to which the cutting blade 105 is demountably secured by rivets as 112 or by conventional plow bolts, by having their heads countersunk flush with the outer surface of said blade.

Having reference to Figures 9 and 10, it will be noted that the cutting blade 105, of my invention, is in plan outline a rhomboid, having its acute angles formed at about 45 degrees. It is composed of tool steel of sufficient thickness to do the intended work without buckling or breaking. The cutting edge 113 may either be tempered or faced with stellite or similar material of extreme hardness.

By the foregoing arrangement either one, two or three said blades may be secured to the respective members by pivotal bolts as 114 passing through said outer series of holes; whereas the tangential angle of the respective cutting edge 113 may be adjusted to alter its angle of attack against the bed R by regulation of the adjustment bolts 115 in respect to the slots 108.

The number of said blades on each respective axles 95 and 96 may be varied to suit the rate of travel of said machine, or to vary the intermittance of the strokes of said blades against the beds to compensate for different ratios of gearing in the train comprising the present mechanism.

It will be apparent that when the rear end of the frame B is raised or lowered by the means disclosed, said frame describes a vertical arc from the bracket 49.

In practice I have found that with the axle 33 disposed fixedly at any given spacing from said bracket the distance between the sprocket 92 and the sprocket 91 varies so considerably at different elevational points of B that the chain 93 becomes inoperative, even under the influence of the belt tightener 94.

To correct said variation and to maintain said chain at a uniform tension I attach the axle 33 to the compensating member 116 by bearings as 117 and 117 shown in rear elevation in Figure 4.

Said member is arranged to swing oscillatively about pivotal pins as 118 secured to the respective side members 40 and 41, as is well illustrated in Figures 7 and 8. Obviously, with said axle 33 connected with the corresponding end of the shaft 85 by the respective spacer-bars 88 and 88' the distance between said sprockets remains equal at any and all regulated levels of the frame B.

It should be further noted that by my novel means of coupling the machine M to the pilot P ability is provided to turn said pilot sharply to right or left, substantially to a right angle with relation to the machine M.

In accordance with the provisions of the patent statutes I have described herein the principles of operation of my invention, together with the device which I now consider to represent the best embodiments thereof; but I desire to have it understood that the device shown is only illustrative, and that the invention may be carried out by other means and applied to uses other than those above set out.

What I claim as new, and desire to protect by Letters Patent of the United States, is:—

1. A plant thinning implement, comprising in combination, an upper framework, ground-engaging drive-wheels supporting the rear end of the framework, a steerable element supporting the forward end of the framework, a rearwardly-extending tiller pivoted centrally at the forward end to said element and adapted to slide radially and horizontally thereover, means pivotally connecting the forward end of said framework to said tiller at a point intermediate the tiller's length, manually-operable means carried by said framework and adapted to move the tiller right and left; a lower framework beneath the upper, means connecting the forward end of said lower framework with the tiller, said means engaged pivotally for limited up and down movement of the rear end of said lower framework, a transverse rock-shaft mounted on the upper framework, a control lever to rock and lock said shaft, cranks secured to said shaft, connecting rods linking said cranks to the rear end of said lower framework, whereby actuation of said lever alters the relative positions of said upper and lower frameworks.

2. In an implement of the kind described, a front support including, parallel side-runners rounding upwardly and inwardly to form a bridge across the front, a transverse bridge member rising upwardly from runner to runner adjacent the rear ends of said runners, a transverse bridge member intermediate said front and rear bridge members, an arcuate track disposed substantially parallel with the runners and with its respective limbs secured to said intermediate bridge member and with its arch secured to said rear bridge member, and means to connect said support with a draft agent.

3. In a front support for a thinning implement as set forth in claim 2, longitudinal flanges projecting downwardly from said runners and arranged to prevent lateral displacement of said support.

4. An implement as specified in claim 1, comprising in combination, a driven axle projecting outwardly at each side beyond drive wheels, a driven shaft disposed parallel to, in alinement with, and in forwardly and variably-spaced relation to said axle, spacers journaled at their respective rear ends upon said axle ends and at their forward ends upon said driven-shaft ends, means to retain the respective spacer ends in place, drive means carried by the axle and acting on driven means to rotate said shaft, rotary tools driven from said shaft and means acted on by said spacers to displace the axle longitudinally of the implement when the level of the driven shaft is varied.

SAMUEL M. BLACK.